United States Patent
Devitt et al.

[15] 3,690,418
[45] Sept. 12, 1972

[54] ENCLOSED AUTOMATIC SLACK ADJUSTER FOR VEHICLE SHOE BRAKES

[72] Inventors: Lloyd Raymond Devitt, 30 Plymouth St., St. Catherines, Ontario; Gordon Marvin Devitt, Allanport Rd., Allanburg, Ontario, both of Canada

[22] Filed: April 21, 1971

[21] Appl. No.: 136,034

[52] U.S. Cl. .................188/79.5 K, 188/196 BA
[51] Int. Cl. ..............................F16d 65/56
[58] Field of Search ................188/79.5 K, 196 BA

[56] References Cited

UNITED STATES PATENTS

| | | | |
|---|---|---|---|
| 3,307,661 | 3/1967 | Bostwick | 188/79.5 K X |
| 3,526,303 | 9/1970 | Lodjic et al. | 188/79.5 K X |

Primary Examiner—Duane A. Reger
Attorney—Cavanagh & Norman

[57] ABSTRACT

The specification discloses an automatic slack adjuster all moving parts of which are enclosed for connecting a brake rod to an actuating cam shaft for a shoe brake in which the adjuster body is mounted on the actuating camshaft by a worm gear rotatable within the body. A worm shaft which on rotation positions said worm gear in the body extends exteriorly thereof to mount a first ratchet part fixed to the shaft and a second ratchet part rotatable thereon. A fixed housing extending from the body and about the worm shaft accommodates an axially slidable actuating member which develops relative rotational motion between the fixed housing and the second ratchet part when moved from an inner to an outer position or from an outer to an inner position. The actuating member is connected by a tension member to a fixed abutment or anchorage but is normally biased outwardly by a spring, the limit of the outward position being determined by a sealing cap in such manner that all operating mechanism and moving parts are enclosed.

5 Claims, 4 Drawing Figures

PATENTED SEP 12 1972 3,690,418

INVENTORS
LLOYD R DEVITT
GORDON M DEVITT

BY Cavanagh & Norman

INVENTORS
LLOYD R DEVITT
GORDON M DEVITT
BY Cavanagh & Norman

ENCLOSED AUTOMATIC SLACK ADJUSTER FOR VEHICLE SHOE BRAKES

This invention relates to an enclosed automatic slack adjuster for connecting a brake rod to an actuating cam shaft of the shoe brake type.

A slack adjuster for a vehicle shoe brake generally comprises a body including a brake arm connecting between an actuating brake rod and the actuating cam shaft of the brake itself so that motion of the brake rod causes rotation of the brake cam shaft. The conventional slack adjuster body carries a worm gear rotatable therein which mounts by spline connection to a corresponding spline on the actuating cam shaft. The slack adjuster body is therefore mounted on the slack adjuster cam shaft by the worm gear. A worm pinion shaft including a worm pinion thereon is mounted in the slack adjuster body and has a portion of its worm pinion shaft extending exteriorly of the body. An adjustment of the worm pinion shaft will effect an adjustment of the actuating camshaft relative to the brake rod to compensate for brake shoe wear. A number of devices have been provided for automatic adjusting for brake shoe slack by providing a linkage between the brake rod and the worm shaft exterior of the slack adjuster body by translating a resulting twisting motion on said shaft through a ratchet device by providing a fixed ratchet part on the worm shaft and a second ratchet part rotatable thereon which is rotatably moved according to the travel of brake rod actuating motion. When such motion achieves an increment determined by the geometry of the linkage and ratchets and the degree of brake shoe wear, the return motion of the ratchet will be sufficient to allow the engagement of another ratchet tooth. In this manner successive tightening of the brake shoe linings can be achieved at successive degrees of wear of the linings themselves as a result of articulation of the brake rod in normal braking function during service. Such automatic brake slack adjuster devices all provide linkage and moving parts exterior of the slack adjuster body and as a result foreign material may impinge on such working parts causing difficulties of inspection and difficulty in operation, corrosion being a particularly severe problem.

It is the main object of this invention to provide an automatic slack adjuster in which all working parts are totally enclosed.

It is another object of the invention to provide an automatic slack adjuster which may be set up to operate responsive to positive brake operation or responsive to the relief of brake pressure.

Other objects will be appreciated by a study of the following specification taken in conjunction with the accompanying drawings.

Figure 1:
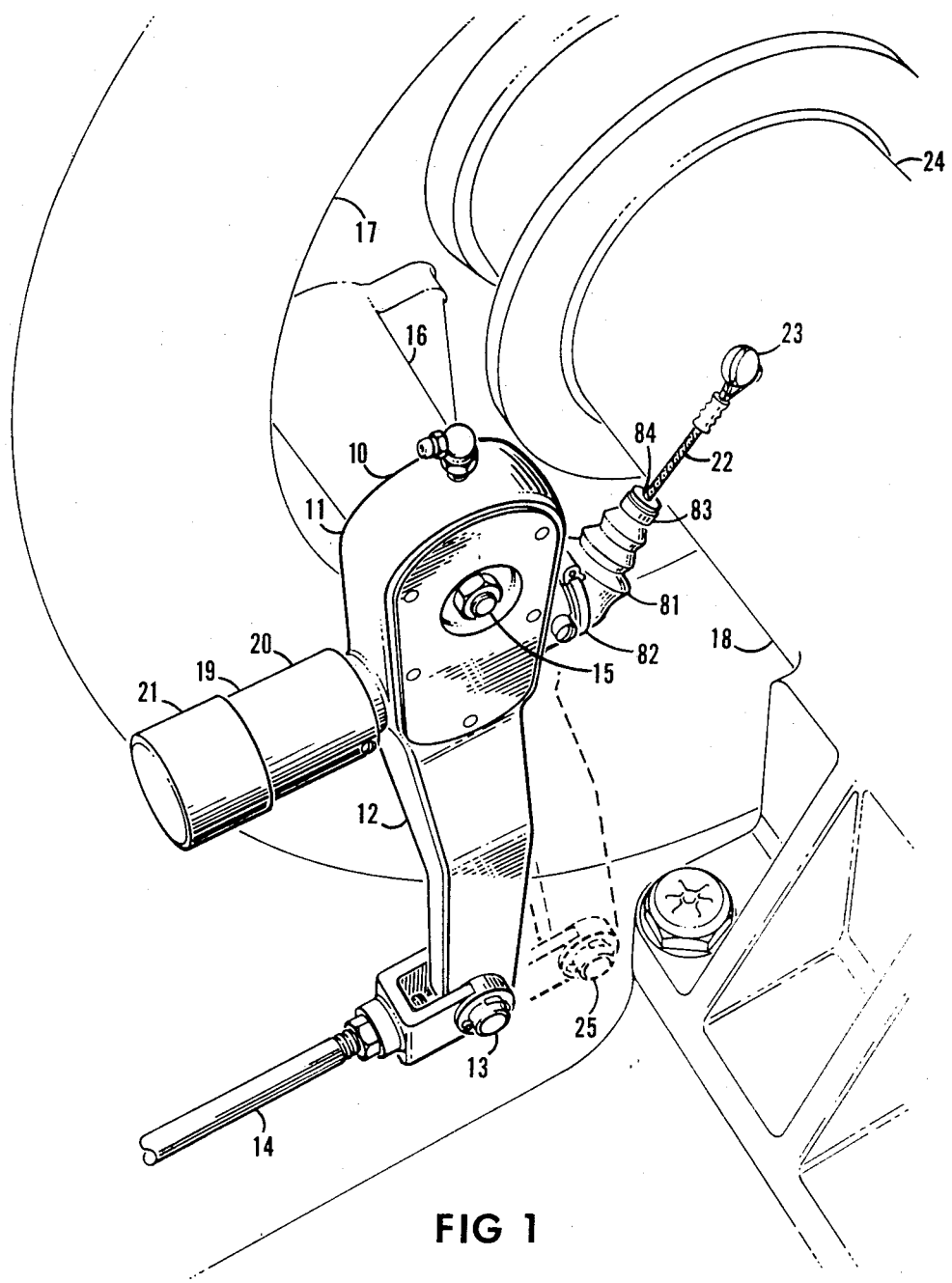
FIG. 1 is a perspective view of one manner of connecting the totally enclosed brake slack adjuster of the invention, the same being shown in the full withdrawn position of the brake rod corresponding to full brake actuation.

Referring to the drawings and in particular FIG. 1, the enclosed slack adjuster 10 of the invention comprises the body casting 11 having a brake arm portion 12 extending for pin connection 13 to the brake rod 14. The adjuster 10 is mounted on an actuating cam shaft 15 of the shaft brake system 16 of wheel assembly 17 on axle 18. Transport vehicles having air brakes ordinarily have a slack adjuster device connecting between the brake rod and the actuating cam shaft. The present invention embodies an automatic slack adjuster mechanism 19 fixedly mounted on the body 11 and totally enclosed by its fixed tubular housing 20 and cap 21 to protect all working parts from foreign material, corrosion and the like. A tension member preferably in the form of a flexible cable 22 extends exteriorly of the body 11 to a fixed anchorage mechanism such as is provided by the screw 23 fastened in housing 24 and vehicle axle structure 18 which anchorage may be adjustable. The brake rod 14 is shown in the retracted position, i.e., in the position of full application of brakes and in the forward normal position indicated partially by chain lines 25, positions the adjuster 10 rotatably about shaft 15 in a more forward position of its actuating arm 12.

Figure 2:
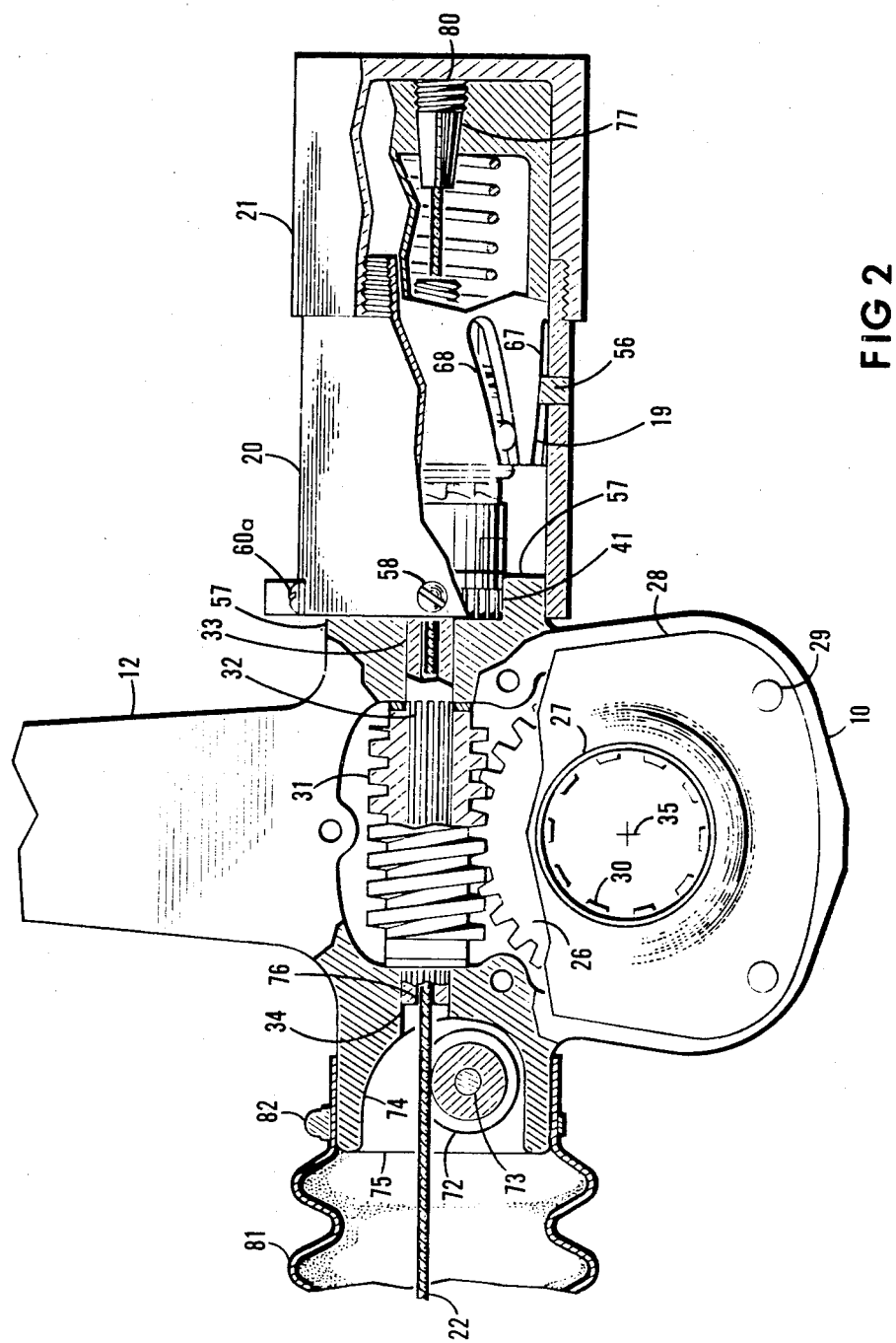
FIG. 2 is an elevation of the slack adjuster of FIG. 1 being partly broken away to reveal parts thereof in section and especially the tension anchorage member thereof.
Figure 3:
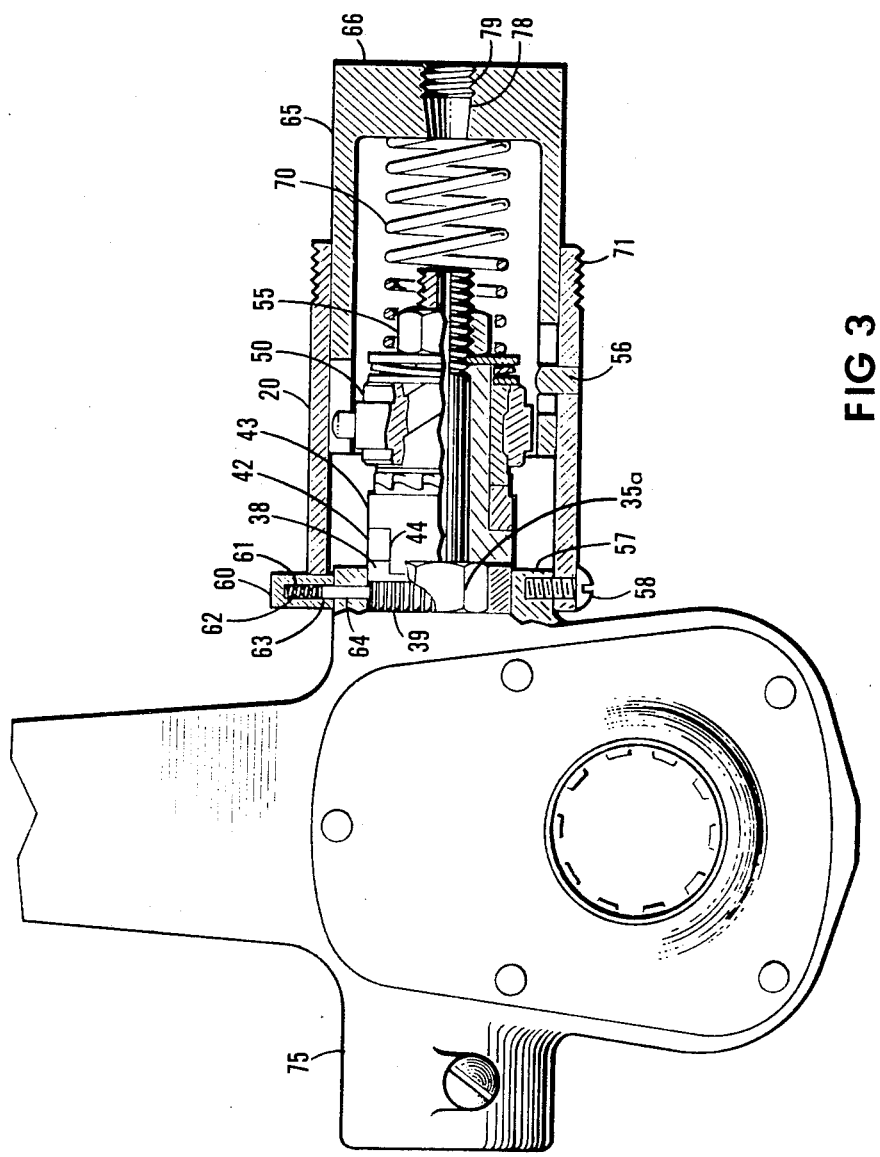
FIG. 3 is a further view of the adjuster of FIG. 2 revealing specific components thereof in sectional detail.
Figure 4:
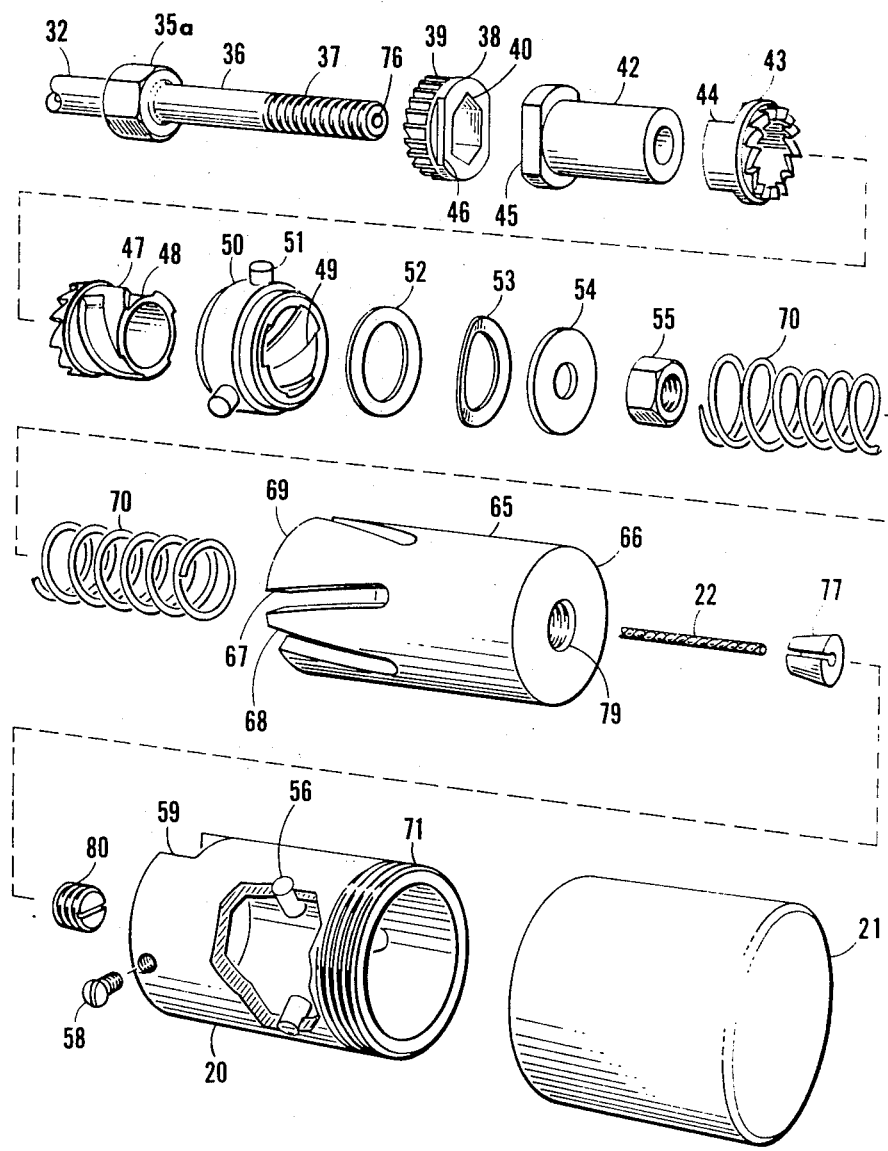
FIG. 4 is an expanded perspective view of the components shown in section in FIG. 3 revealing the order of assembly thereof.

Referring also to FIGS. 2, 3 and 4, gear 26 is rotatably mounted within body 11 by flanges 27 thereon rising within the cover plates 28 rivetted as at 29 to said body and preferably carries internal splines 30 adapted to slidably seat on corresponding splines of a brake actuating cam shaft (not shown) which latter serves to mount the shaft adjuster of the invention on the brake system of the vehicle. A worm pinion 31 adapted to articulate with gear 26 is force fit onto a scored or splined worm shaft 32 journalled in transverse bores 33, 34 of the body tangentially with respect to body axis 35 being the axis of the actuating cam shaft 15 and extends externally of said body by a head portion 35a and a ratchet shaft portion 36 extending therebeyond to present threads 37. An anti-backoff ring 38 having peripheral teeth 39 seats by its hexagonal boss 35b in body socket 41 and receives ratchet bushing 42 in assembly with first ratchet 43 thereon in such manner that the axially extending side flanges or lugs 44 slidably extend over the lock surfaces 45 and 46 of the bushing 42 and anti-backoff ring 38. A second ratchet 47 is rotatably mounted on the ratchet portion 36 of worm shaft 32 by bushing 42, said second ratchet having spiral flutes 48 adapted to receive the internal splines 49 of the actuating collar 50 slidably receivable therein and having radially outwardly directed stud members 51 thereon adapted to slidably move within the fixed housing 20. Spring biasing washer assembly 52, 53, 54 holds actuating collar 50 and the first and second ratchet devices in assembly on ratchet shaft portion 36 by nut 55 articulating in threads 37 of the ratchet shaft portion 36. The spiral spline action of actuating collar 50 with the second ratchet 47 allows a limited degree of axial motion of said collar according to the tightening of nut 55 due to space between the washers 52, 54 provided by the washer spring 53. In this way the increment of adjustment accomplished by the slack adjuster of the invention may be varied by a presetting for it will be evident that in order to effect rotation of the second ratchet the actuating collar 50 must move rotatably against pressure of spring 53 a distance determined by the lost motion of the spaces between the washers 52, 53, 54. This gap space thus provides for adjustment of increment accomplished in each brake slack adjustment.

The housing 20 presents inwardly directed studs 56. Housing 20 is fastened to boss 57 of body 11 by suitable screws 58 and radially located thereon by index opening 59 adapted to receive indexing lug 60 fastened to said boss 57 by screws 60a (FIG. 2) and having a bore 61 adapted to receive a spring 62 and indexing rod 63 passing through bore 64 of the boss to articulate with the indexing teeth 39 of indexing ring 38. An axially movable actuating member 65 preferably in the form of a tube slidable within housing 20 and having a closed end 66 embodies cam surfaced slots 67, 68 which in adjacent pairs diverge axially outwardly from the inner terminus or edge 69 on said member. The actuating member or sleeve 65 is adapted in its adjacent pairs of slots 67, 68 to accommodate with one of said pairs a collar stud 51 and with another of said pairs a housing stud 56 thus to cause by axial motion of said actuating sleeve rotation of the actuating collar 50 relative to the fixed housing 20. The actuating member or sleeve 65 is biased outwardly by biasing spring 70, the limit of its outward position being determined by the outer cap member 21 threaded onto the fixed housing 20 as indicated by threads 71 on the latter.

A tension member preferably in the form of cable 22 proceeds from an anchorage 23 over pulley wheel 72 journalled by fixed axle 73 in a cavity 74 of body boss 75 and communicates through a through-bore 76 of the worm shaft 32 to be gripped by the split tapered collar 77 seating in tapered bore 78 at the base of threaded bore 79 in end portion 66 of the actuating sleeve 65 and is held in clamped position therein by the clamping screw 80 thus to provide a firm connection for said cable.

As has been before indicated there are two general ways of using the device of the invention. The actuating sleeve may be at its position of maximum outward extent when the brake rod 14 is fully retracted, i.e., the brakes are fully on, for example, as indicated in FIG. 1. On the other hand if in FIG. 1 the brake draw bar 14 connects from the opposite direction then the full brake on position would correspond to the most outward position of the actuating member 65. Thus in the neutral or non-actuated position of the brake mechanism the tension member 22 may be fully extended if on brake actuation the slack adjuster arm 12 is rotated about axis 35 to shorten the exposed portion of the tension member 22. Also in the normal unactuated position of the brake mechanism the exposed portion of the tension member 22 may be at its shortest extent corresponding to the most outward position of the actuating member 65 if upon actuation of the braking system the arm 12 moves in such direction that the exposed portion of the tension member 22 increases. Either way the device of the invention performs satisfactorily for the reason that the degree of swing of the adjuster arm 12 during brake actuation or the release of brake actuation will accomplish a corresponding degree of rotation of the second ratchet relative to the first depending upon brake shoe wear since the ratchet of arm 12 is translated through the internal mechanism of the brake adjuster of the invention and the tension member 22 to an anchorage which is fixed relative to the mounting axis 35, i.e., the brake cam shaft axis and the brake arm pin 13. Rotation of the second ratchet 47 effecting more than one tooth increment of rotation of the first ratchet 43 with the corresponding locking of the detent teeth 39 allows upon the relaxation of the ratchets due to the outward sliding motion of the actuating member 65 the following engagement of the second ratchet teeth in the next successive teeth of the first ratchet. An adjustment of the nut 55 will determine the magnitude of such increment in excess of ratchet increment by virtue of the angle of the helical grooves of the actuated collar 50 and the accumulated lost motion of the space in the washer assembly 52, 53, 54 as described.

The enclosed automatic slack adjuster of the invention entirely contains within surfaces which do not move, that is to say, the outer surfaces of the housing 20 and cap 21 all moving parts which enables the interior of such assembly to be sufficiently packed with lubrication. The one component extending exteriorally of the body provides for a boot or flexible sleeve 81 connected by sealing clamp 82 to cavity boss 75 of body 11 and terminating as at 83 by a suitable clamp in an intermediate region 84 of the tension member 22. It will be understood that the mounting or anchorage 23 may be in the form of an adjustable anchorage without departing from this invention. It will be apparent that an adjustment at the anchorage enables the positioning of the actuated member 65 relative to the other components in any one installation with regard to the adjustment to be made with respect to the first increment of wear on the brake linings. Once the first increment is accomplished the device will continue to adjust in equal increments according to brake lining wear. However, the first increment of adjustment may be large or small depending upon the specific position of the actuating member 65 relative to the other components as determined by the anchorage connection.

What we claim as our invention is:

1. An enclosed automatic slack adjuster for connecting a brake rod to an actuating cam shaft of the shoe brake type and comprising: a body having a brake arm thereon connectable to said brake rod; a gear rotating in said body and connectable on said cam shaft for mounting said body thereon; a worm gear in said body including a worm shaft fixed thereto mounted in said body and extending outwardly thereof and adapted upon rotation to rotate said mounting gear; one rotary ratchet part fixed to said worm shaft exterior of said body; a second ratchet part adapted to articulate with the first and rotatable on said worm shaft including spring means biasing said second part for engagement with the first; a fixed tubular casing disposed coaxially about said worm shaft and said ratchet parts and extending from said body to define a housing; an actuating member within said housing and movable axially to effect rotation of said second ratchet part relative to said housing and said first ratchet part; a cap for said housing determining the outward limit of motion of said actuating member in said housing; a spring biasing said actuating member to the outward position; and a tension member communicating from said actuating member to a fixed anchorage to effect actuation of said actuating member and said second ratchet part responsive to motion of said brake arm by a brake rod relative to said anchorage.

2. A slack adjuster of claim 1 in which the worm shaft is hollow and the tension member extends from said actuating member through said hollow shaft exterior of said body for connection to an anchorage.

3. The slack adjuster of claim 1 and a collar about said second ratchet part slidably connected to the latter by helically directed spline means, the spring means for said second ratchet part being adjustably located between said helical collar and said worm shaft.

4. The slack adjuster of claim 1 in which the tension member is flexible, the worm shaft is in a form of a hollow tube having a central bore, the tension member connects from the actuating member through the bore of the worm shaft and beyond the body to an anchorage; and an idler wheel in said body adapted to support said tension member over an arc defined thereby between the worm shaft and the anchorage of said tension member.

5. The slack adjuster of claim 1 and a flexible sealing enclosure extending from said body about said tension member.

* * * * *